United States Patent [19]

Payne

[11] 3,997,958

[45] Dec. 21, 1976

[54] SPEEDOMETER CABLE HOUSING RELEASE AND REMOVAL TOOL

[76] Inventor: Joe E. Payne, 7208 NW. 44th, Bethany, Okla. 73008

[22] Filed: Feb. 9, 1976

[21] Appl. No.: 656,335

[52] U.S. Cl. .......................... 29/239; 29/267
[51] Int. Cl.[2] .......................... B23P 19/04
[58] Field of Search ............ 29/225, 270, 271, 267, 29/203 HM, 239, 200 H, 200 D; 81/3 R

[56] References Cited

UNITED STATES PATENTS

| | | | |
|---|---|---|---|
| 3,103,836 | 9/1963 | Bristol | 81/3 R |
| 3,110,093 | 11/1963 | Johnson | 29/200 H |

*Primary Examiner*—Al Lawrence Smith
*Assistant Examiner*—J. C. Peters
*Attorney, Agent, or Firm*—Dunlap, Codding & McCarthy

[57] ABSTRACT

An improved speedometer cable housing release and removal tool for disconnecting a speedometer cable housing from the speedometer head of an automobile or the like. The tool has an elongated curved body portion or handle with a linear portion at one end of the handle and extends to form a combination fulcrum-guide that is disposed generally in a plane perpendicular to the handle. The combination fulcrum-guide has a bending radius along a cable housing receiving groove permitting the tool to straddle the speedometer cable housing, thereby permitting the speedometer cable housing to serve as a finder for the tool. A depressing arm is connected to and proceeds from the combination fulcrum-guide generally parallel to an axis extensive through the linear portion of the handle. The depressing arm is of adequate length to reach a release trigger which is attached to the speedometer cable housing. A depressing tab is connected to the depressing arm and is disposed to engage and operate the release trigger of the speedometer cable housing.

20 Claims, 10 Drawing Figures

SPEEDOMETER CABLE HOUSING RELEASE AND REMOVAL TOOL

BACKGROUND OF THE INVENTION

1. Field of the Invention

This invention relates to improvements in tools, and more particularly but not by way of limitation, to an improved speedometer cable housing release and removal tool.

2. Description of the Prior Art

As well known in the art of automobile mechanics, it is frequently necessary to remove a speedometer or tachometer cable housing from the head to which it is attached for the purpose of servicing or repairing the speedometer or tachometer of an automobile or the like. For many years it has been the practice of automobile manufacturers to mount a speedometer and/or tachometer in the dashboard of an automobile. Also for many years, it has been the practice to attach an actuating cable drive to the reverse or back side of the speedometer head by means of an attaching mechanism. This cable serves to operate the speedometer, and the cable usually has a protective housing that connects to the back of the speedometer head.

In recent years, it has become common to locate a large amount of optional equipment, controls and electrical wiring behind the dashboard of a typical automobile. As a consequence thereof, the speedometer cable housing has become more and more inaccessible due to the closely spaced apparatus located behind the dashboard of the automobile.

Various general purpose tools have been used for the purpose of disconnecting the speedometer cable housing from the speedometer head, but none have been found to be universally usable due to the relative inaccessibility and different attaching mechanisms and devices in use. Certain problems have been encountered in service or repair of such devices due to the above-mentioned inaccessibility, such as, for example: the general difficulty of even getting a tool within the proximity of the attaching mechanism; injuries that result to workmen due to the unnecessary abrading of exposed hands and arms; and, the excessive amount of time consumed by even a skillful workman in detaching the cable housing.

More recently, American automobile manufacturers, namely Chrysler Corporation, American Motors Corporation, General Motors Corporation and Ford Motor Company, all located in the state of Michigan in or around the city of Detroit, have adopted various designs of attaching mechanisms that employ push-on type mechanisms that are held in place by the use of various combinations of release triggers and detent grooves. The recent designs are manufactured annually in very large quantities and distributed throughout the United States, and to some extent, throughout the world.

SUMMARY OF THE INVENTION

It is an object of the present invention to provide a mechanic's tool by which a speedometer cable housing may be easily and quickly disconnected from a speedometer head.

Another object of this invention is to decrease the possibility of injury to the mechanic when disconnecting a speedometer cable housing from a speedometer head.

An additional object of this invention is to decrease the possibility of damage to the surrounding electrical apparatus and other equipment located behind the dashboard of an automobile when detaching a speedometer cable housing from a speedometer head.

Other objects and advantages of the invention will be evident from the following detailed description when read in conjunction with the accompanying drawings.

DETAILED DESCRIPTION OF THE EMBODIMENT OF FIGS. 1 THROUGH 4

Figure 1:
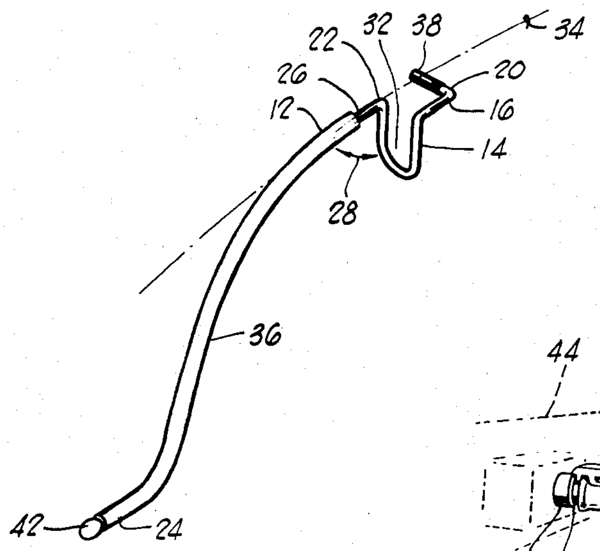
FIG. 1 is a perspective view of a speedometer cable housing release and removable tool constructed in accordance with the present invention.

Referring to the drawings in general, and more particularly to FIG. 1, the reference character 10 generally designates a speedometer cable housing release and removal tool constructed in accordance with the present invention. The speedometer cable housing release and removal tool 10, hereinafter also referred to by the term "mechanic's tool," comprises a handle portion 12, a combination fulcrum-guide 14, a depressing arm 16 and a depressing tab 20, all of which are connected. In the preferred construction, the mechanic's tool 10 is formed from a single body of material such as a steel alloy rod or the like having the necessary strength characteristics to depress a release trigger which will be described below.

The handle 12 is an elongated, curvilinearly formed member that is circular in cross-section. The handle 12 has a first end 22 and a distal second end 24, and usually should be sufficiently rigid to retain its shape under the forces exerted upon it during use. However, for some applications, it may be best to make the handle 12 of a semi-rigid material that is sufficiently stiff to operate in the manner to be described below, yet sufficiently flexible to be selectively shaped for purposes of fitting the mechanic's tool 10 into very congested areas. The handle 12 has a generally linear portion 26 near the first end 22. A first extension, also referred to as the combination fulcrum-guide 14, is connected to the first end 22 of the handle 12 at an angle 28 to the linear portion 26, the angle 28 being approximately 90°. The combination fulcrum-guide 14, arcuately formed so as to be semi-circular in shape to form a cable housing receiving groove 32, is disposed to extend generally normal to an axis 34 which extends through and along the linear portion 26 of the handle 12. The cable housing receiving groove 32 is formed with a sufficiently large interior radius to straddle a cable housing in a manner which will be described below.

A second extension, also referred to as the depressing arm 16, is connected to and supported by the combination fulcrum-guide 14, extends generally normal to the fulcrum-guide 14, and is parallel to the axis 34. The depressing arm 16 supports a third extension which is the depressing tab 20, the depressing arm 16 providing a predetermined spatial relationship between the depressing tab 20 and first end 22 of the handle 12.

The mechanic's tool 10 is equipped with 1) a sleeve 36, made of polymeric material or the like, which covers most of the handle 12; 2) a wear bushing 38, also made of a polymeric material or the like, which covers the depressing tab 20; and 3) a safety knob 42 made of epoxy or the like, located at the second end 24 of the handle 12. The function of the sleeve 36 is to serve as a grip cushion for the operator and as an insulator for the handle 12 to reduce the possibility of a hazardous short circuit resulting from accidental contact between the handle 12 and an electric current conductor or terminal (not shown) juxtaposed to the desired work location. The function of the wear bushing 38 is to serve as a replacement wear member for the depressing tab 20 and as an insulator similar to the sleeve 36. The function of the safety knob 42 is to blunt the second end 24 of the handle 12 for safety purposes.

Figure 2:
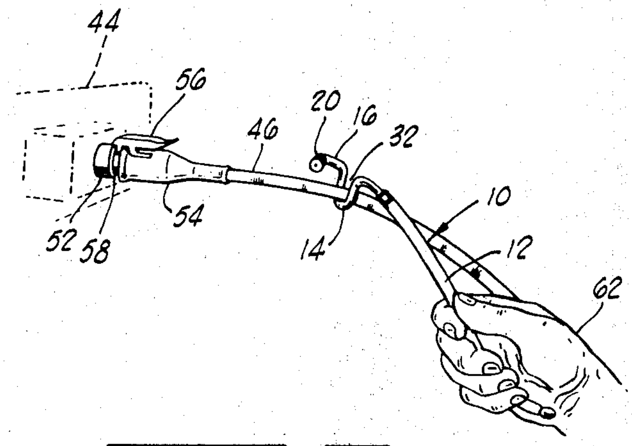
FIG. 2 is an illustrative drawing showing how an operator engages the cable housing with the fulcrum-guide portion of the speedometer cable release and removal tool of FIG. 1. It also shows one attaching mechanism by which a cable housing is attached to a speedometer head.

Referring now to FIG. 2 of the drawing in which a speedometer head 44 is represented in phantom, it will be noted that there is attached to the speedometer head 44 a cable housing 46, which is shown in a locking mode accomplished by the engagement of a speedometer head male connector 52 partially disposed within a cable housing female connector 54 and held in such locking mode by a spring biased release trigger 56 biased into engagement with a detent groove 58. The illustrated cable housing female connector 54 and the speedometer head male connector 52 form an attaching mechanism typically found in recent models of automobiles manufactured by the Chrysler Corporation and American Motors Corporation.

Also shown in FIG. 2 is the mechanic's tool 10 of the present invention having the handle 12 disposed within an operator's hand 62. As will be noted, the mechanic's tool 10 is in slidable relationship with the cable housing 46 having the cable housing 46 disposed within the cable housing receiving groove 32 whereby the combination fulcrum-guide 14 in conjunction with the cable housing 46 may act as a finder for the mechanic's tool 10 even though the operator's visual contact with the work location is totally or partially obsured.

Figure 3:
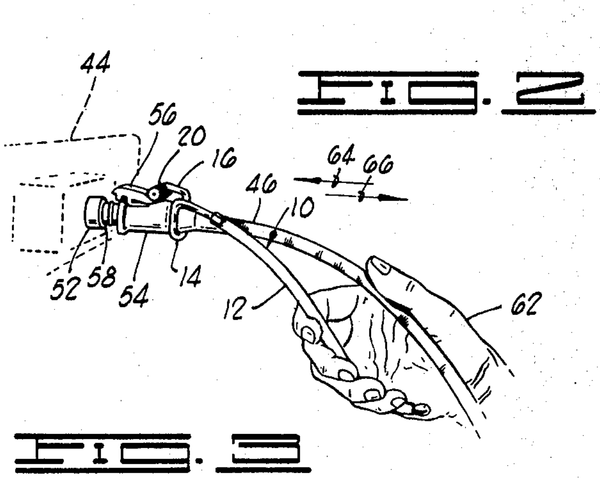
FIG. 3 is an illustrative drawing showing the cable housing with the release trigger engaged and held open by the speedometer cable housing release and removal tool of FIG. 1.
Figure 4:
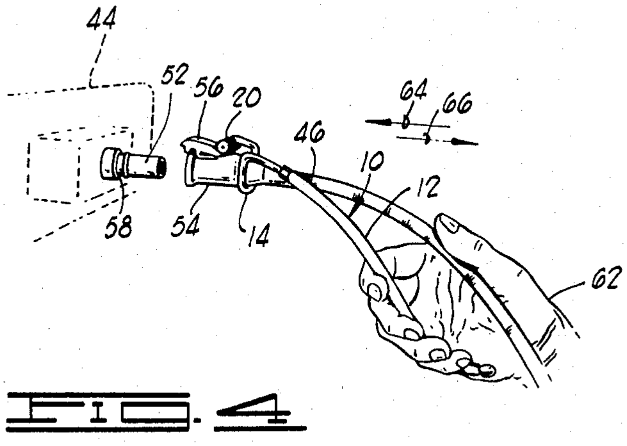
FIG. 4 is an illustrative drawing showing the cable housing and the speedometer housing release and removal tool of FIG. 1 after the cable housing has been detached.

Referring to FIG. 3, it will be noted that as the operator of the mechanic's tool 10 proceeds to move the tool in a forward direction 64 until the combination fulcrum-guide 14 contacts the cable housing female connector 54, the mechanic's tool 10 may be considered one handle of a pair comprised of the handle 12 and the cable housing 46 pivotal about the combination fulcrum-guide 14 when the mechanic's tool 10 is in operation. It will also be noted that the depressing tab 20 is selectively positionable to operate the spring biased release trigger 56 by the simple closing of the operator's hand 62 as in the operation of a pliers, a common tool well known in the automobile mechanic's trade. At the closing of the operator's hand 62, the combination fulcrum-guide 14 engages the body of the cable housing female connector 54 which acts as a fulcrum point, and moves the depressing tab 20 which is attached to the depressing arm 16 into contact with the spring biased release trigger 56. A continued closing motion of the operator's hand 62 accomplishes the release of the spring biased release trigger 56 from the detent groove 58 found in the male connector 52 as shown, thus enabling the operator to move the entire engaged assembly, namely the operator's hand 62, the mechanic's tool 10, the cable housing 46 and the cable housing female connector 54 in a removal direction 66, detaching the cable housing female connector 54 from the speedometer head male connector 52 which is permanently connected to the speedometer head 44 as shown in FIG. 4.

DESCRIPTION OF THE EMBODIMENT OF FIGS. 5, 6 AND 7

Figure 5:
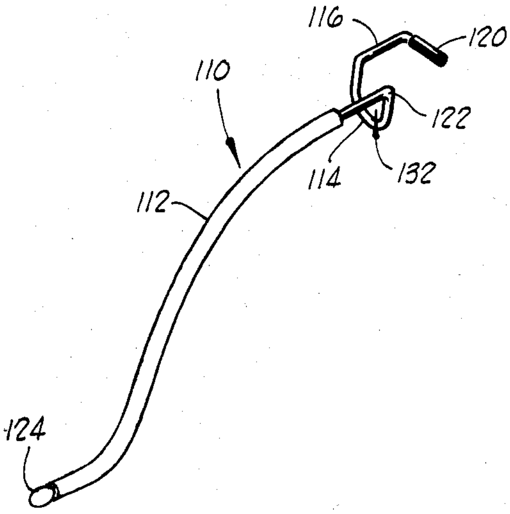
FIG. 5 is a perspective view of another embodiment of a speedometer cable housing release and removal tool constructed in accordance with the present invention.
Figure 6:
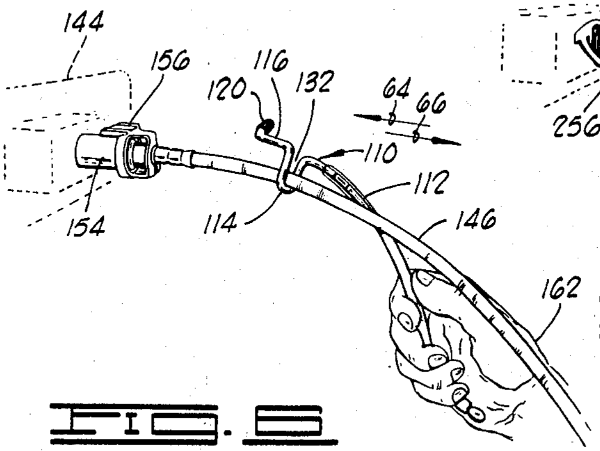
FIG. 6 is an illustrative drawing showing how an operator engages the cable housing with the fulcrum-guide portion of the embodiment of the speedometer cable housing release and removal tool of FIG. 5. It also shows another attaching device by which a cable housing is attached to a speedometer head.
Figure 7:
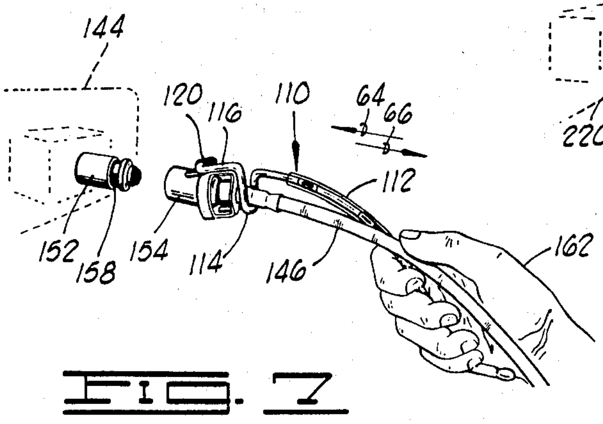
FIG. 7 is an illustrative drawing showing the cable housing and the speedometer cable housing release and removal tool of FIG. 5 after the cable housing has been detached.

A second embodiment of the mechanic's tool of the present invention is shown in FIGS. 5, 6 and 7, and is generally designated by the reference character 110. The construction of the mechanic's tool 110 is similar to that of the mechanic's tool 10 of FIG. 1 with the exceptions that will be pointed out. Like numerals with a prefix of 1 will be used for components which are of similar design, purpose and use.

The function of the mechanic's tool 110 is the same as that of the mechanic's tool 10, to wit, the detaching of a cable housing 146 from a speedometer head 144 in the manner and for the reasons discussed above. The mechanic's tool 110 comprises a handle 112, a combination fulcrum-guide 114, a depressing arm 116 and a depressing tab 120. The mechanic's tool 110 is the same as the mechanic's tool 10 above described with the exception that the combination fulcrum-guide 114 connected to, and formed to the reverse side of, the handle 112 is of a different internal radius characteristic; the depressing arm 116 extends from the combination fulcrum-guide 114 and is of a different reach characteristic; and the depressing tab 120 extends from the depressing arm 116 in the opposite direction, all of these differences being for the purpose of accommodating a speedometer head 144 and cable housing 146 of a different design and having a different attaching mechanism than that of the speedometer head 44 and the cable housing 46 described above. The illustrated cable housing female connector 154 and the speedometer head male connector 152 form an attaching mechanism typically found in recent models of automobiles manufactured by the Ford Motor Company.

As shown in FIG. 6, the mechanic's tool 10 is held via the handle 112 by an operator's hand 162, and the mechanic's tool 110 has been placed in slidable relationship with the cable housing 146. That is, the mechanic's tool 110 is in slidable relationship with the cable housing 146, having the cable housing 146 disposed within the cable housing receiving groove 132 whereby the combination fulcrum-guide 114 in conjunction with the cable housing 146 may act as a finder for the mechanic's tool 110, even though the operator's visual contact with the work location is totally or partially obscured.

Referring to FIG. 7, the operator of the mechanic's tool 110 has proceeded to move the tool in a forward direction 64 until the combination fulcrum-guide 114 contacts a cable housing female connector 154. The mechanic's tool 110 may be considered one handle of a pair comprised of the handle 112 and the cable housing 146 pivotal about the combination fulcrum-guide 114 when the mechanic's tool 110 is in operation. It should be noted that the depressing tab 120 is selectively positioned to operate a spring biased release trigger 156 by the simple closing of the operator's hand 162 as in the operation of a pliers, a common tool well known in the automobile mechanic's trade. At the closing of the operator's hand 162, the combination fulcrum-guide 114 engages the body of the cable housing female connector 154 which acts as a fulcrum point, and moves the depressing tab 120 which is attached to the depressing arm 116 into contact with the spring biased release trigger 156. A continued closing motion of the operator's hand 162 accomplishes the release of the spring biased release trigger 156 from a detent groove 158 formed in the male connector 152 as shown. This enables the operator to move the entire engaged assembly, namely the operator's hand 162, the mechanic's tool 110, the cable housing 146, and the cable housing female connector 154 in a removal direction 66, whereupon the cable housing female connector 154 is detached from the speedometer head male connector 152.

DESCRIPTION OF THE EMBODIMENT OF FIGS. 8, 9 AND 10

Figure 8:
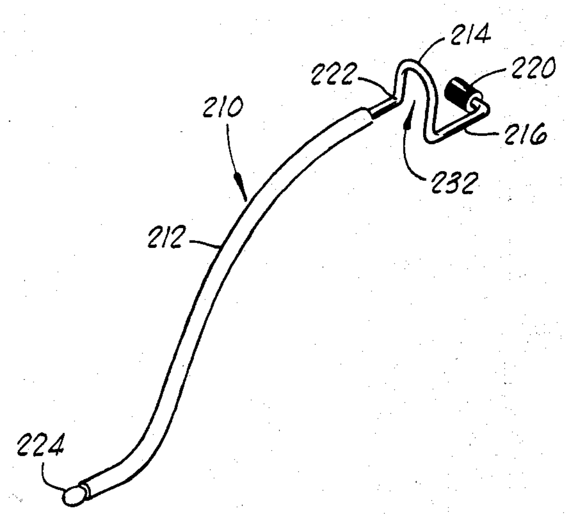
FIG. 8 is a perspective view of yet another embodiment of a speedometer cable housing release and removal tool constructed in accordance with the present invention.
Figure 9:
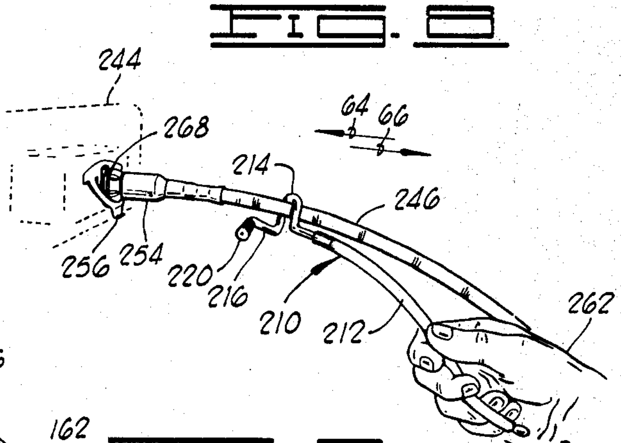
FIG. 9 is an illustrative view showing how an operator engages the cable housing with the fulcrum-guide portion of the embodiment of the speedometer cable housing release and removal tool of FIG. 8. It also shows yet another attaching mechanism by which a cable housing is attached to a speedometer head.
Figure 10:
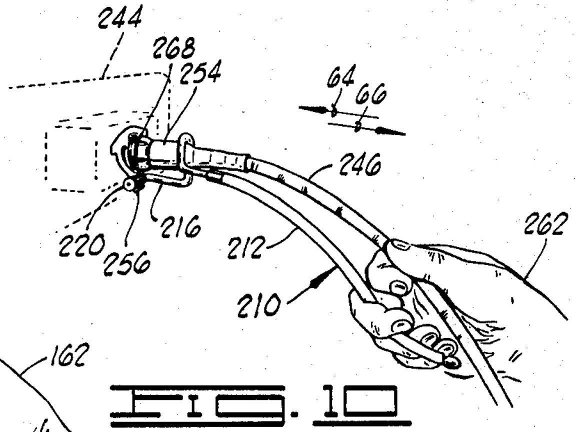
FIG. 10 is an illustrative view showing how an operator engages the cable housing with the fulcrum-guide portion of the embodiment of the speedometer cable housing release and removal tool of FIG. 8.

A third embodiment of the mechanic's tool of the present invention is shown in FIGS. 8, 9 and 10, and is generally designated by the reference character 210. The construction and use of the mechanic's tool 210 is similar to that of the mechanic's tool 10 of FIG. 1 with the exceptions that will be pointed out. Like numerals with a prefix of 2 will be used for components which are of similar design, purpose and use.

The function of the mechanic's tool 210 is the same as that of the mechanic's tool 10, to wit, the detaching of a cable housing 246 from a speedometer head 244 in the manner and for the reasons discussed above. The mechanic's tool 210 comprises a handle 212, a fulcrum-guide 214, a depressing arm 216 and a depressing tab 220. Since the mechanic's tool 210 is generally the same as the mechanic's tool 10 above described, the fulcrum-guide 214 engages the cable housing 246 via a cable housing receiving groove 232, and the cable housing 246 serves as a finder for the mechanic's tool 210 in the manner previously described hereinabove.

As shown in FIG. 9, the mechanic's tool 210 is held via the handle 212 by an operator's hand 262. The mechanic's tool 210 has been positioned by the operator to be in slidable relationship with the cable housing 246 wherein the cable housing 246 is disposed within a cable housing receiving groove 232 and whereby the fulcrum-guide 214 in conjunction with the cable housing 246 acts as a finder for the mechanic's tool 210 even though the operator's visual contact with the work location is totally or partially obscured.

As the operator of the mechanic's tool 210 proceeds to move the tool in a forward direction 64, the fulcrum-guide 214 contacts a cable housing female connector 254, and the mechanic's tool 210 may be considered one handle of a pair comprised of a handle 212 and the cable housing 246 slidably connected by the fulcrum-guide 214 when the mechanic's tool 210 is in operation. It will also be noted that the depressing tab 220 is selectively positioned to operate a spring biased release trigger 256. The cable housing female connector 254 has a flared or flanged shoulder 268 that is secured to the speedometer head 244 by the release trigger 256 that is attached to the speedometer head 244 and is disposed about a male connector (not shown) that also is a permanent part of the speedometer head 244. When the release trigger 256 is forceably moved in the forward direction 64, the release trigger is caused to release its grip on the flanged shoulder 268. This attaching mechanism arrangement is illustrative of that typically found in recent models of automobiles manufactured by the General Motors Corporation.

Having placed the mechanic's tool 210 in the position shown in FIG. 9, and having moved the tool along the cable housing 246 to the position shown in FIG. 10, the continued movement by the operator's hand 262 in the forward direction 64 causes the depressing tab 220 of the mechanic's tool 210 to depress the spring biased release trigger 256 and to disengage the release trigger 256 from the flanged shoulder 268 of the cable housing female connector 254, thus enabling the operator to move the cable housing 246 in the removal direction 66, completing the detachment of the cable housing 246 from the speedometer head 244.

While the present invention has been illustrated as being useful in detaching a speedometer cable housing from a speedometer head, other uses are also contemplated. For example, a tool constructed in accordance with the present invention provides an excellent release tool for a tachometer from its cable drive housing when so attached.

In each of the embodiments described and illustrated herein, the combination fulcrum-guide members have been immovably attached to the handle member. Another embodiment (not illustrated) of the present invention contemplates the attachment of the fulcrum-guide member to the handle by means of a pivotal connection such that the fulcrum-guide member can be rotated relative to the handle member and thereupon fixedly established at any selected rotary position. This arrangement affords the selective spatial establishment of the depressing tab about the attaching mechanism as may be required to engage a release trigger that may be located in positions that differ from those illustrated in the accompanying drawings.

It is clear therefore that the present invention is well adapted to carry out the objects and obtain the ends and advantages mentioned as well as those inherent therein. While presently preferred embodiments of the invention have been described for purposes of this disclosure, it will be recognized that changes may be made which will readily suggest themselves to those skilled in the art and which are encompassed within the spirit of the invention discussed and is defined in the appended claims.

What is claimed is:

1. A speedometer cable housing release and removal tool used to release and remove a speedometer cable housing attached to a speedometer head, the tool comprising:

a handle having a first end;

a fulcrum-guide member connected to the first end of the handle, the fulcrum-guide member having a cable housing receiving groove;

a depressing arm member connected to the fulcrum-guide member; and a depressing tab member connected to the depressing arm member and disposed thereby in predetermined spatial relation to the first end of the handle, the fulcrum-guide member being positionable to receive the cable housing in slidable relationship in the cable housing receiving groove whereby the depressing tab member is selectively positionable to release the cable housing from the speedometer head.

2. The speedometer cable housing release and removal tool of claim 1 further comprising a wear bushing cover on the depressing tab member.

3. The speedometer cable housing release and removal tool of claim 1 further comprising a sleeve cover on the handle.

4. The speedometer cable housing release and removal tool of claim 1 further characterized as being formed from a single rod of material.

5. The speedometer cable housing release and removal tool of claim 1 wherein the fulcrum-guide member extends from the handle at approximately a 90° angle to the handle.

6. The speedometer cable housing release and removal tool of claim 1 wherein the fulcrum-guide member is pivotally connected to the first end of the handle.

7. A mechanic's tool for use in disconnecting a cable housing selectively attachable to a head member, the tool comprising:

a handle having a first end;

a fulcrum-guide member supported by the first end of the handle and having a cable housing receiving groove;

a depressing arm member supported by the fulcrum-guide member; and a depressing tab member supported by the depressing arm member in predetermined spatial relation to the first end of the handle, the tool positionable to slidably receive the cable housing in the cable housing receiving groove, the handle and the cable housing forming a pliers-like combination tool selectively positionable to disconnect the cable housing from the head member.

8. The mechanic's tool of claim 7 further comprising a wear bushing cover on the depressing tab member.

9. The mechanic's tool of claim 8 further comprising a sleeve cover on the handle.

10. The mechanic's tool of claim 7 further characterized as being formed from a single rod of material.

11. The mechanic's tool of claim 7 wherein the fulcrum-guide member extends from the handle at approximately a 90° angle to the handle.

12. The mechanic's tool of claim 7 wherein the fulcrum-guide member is pivotally connected to the first end of the handle.

13. In combination with a cable housing having a cable housing female connector selectively attachable to a head male connector and releasable therefrom by actuating a release trigger, an improved cable housing release and removal tool comprising:

a handle member generally curvilinearly formed between a first end and a second end thereof;

means for pivotally supporting and guiding the handle member on the cable housing; and tab means supported by the handle member for actuating the release trigger when the first end of the handle member is selectively positioned near the cable housing female connector and the handle member is moved relative to the cable housing.

14. The cable housing release and removal tool of claim 13 wherein the means for pivotally supporting and guiding the handle member on the cable housing is characterized as comprising a fulcrum-guide member connected to the first end of the handle member, the fulcrum-guide member having a cable housing receiving groove.

15. The cable housing release and removal tool of claim 14 wherein the tab means is characterized as comprising a depressing tab member disposed in predetermined spatial relation to the first end of the handle, and the fulcrum-guide member being positionable to receive the cable housing in slidable relationship in the cable housing in slidable relationship in the cable housing receiving groove whereby the depressing arm is selectively positionable to engage and actuate the release trigger.

16. The cable housing release and removal tool of claim 14 further comprising a wear bushing cover on the depresing tab member.

17. The cable housing release and removal tool of claim 16 further comprising a sleeve cover on the handle member.

18. The cable housing release and removal tool of claim 15 further characterized as being formed from a single rod of material.

19. The cable housing release and removal tool of claim 15 wherein the fulcrum-guide member extends from the handle member at approximately a 90° angle to the handle.

20. The cable housing release and removal tool of claim 14 wherein the fulcrum-guide member is pivotally connected to the first end of the handle member.

* * * * *